(12) United States Patent
Malefyt et al.

(10) Patent No.: US 10,701,949 B2
(45) Date of Patent: Jul. 7, 2020

(54) COMPOSITIONS AND METHODS FOR PACKAGING PRODUCE

(71) Applicant: AgroFresh Inc., Collegeville, PA (US)

(72) Inventors: Tim Malefyt, Stroudsburg, PA (US); Aishwarya Balasubramanian, Somerset, NJ (US)

(73) Assignee: AGROFRESH INC., Philadelphia, PA (US)

( * ) Notice: Subject to any disclaimer, the term of this patent is extended or adjusted under 35 U.S.C. 154(b) by 828 days.

(21) Appl. No.: 14/719,801

(22) Filed: May 22, 2015

(65) Prior Publication Data

US 2015/0366230 A1    Dec. 24, 2015

Related U.S. Application Data

(60) Provisional application No. 62/014,258, filed on Jun. 19, 2014.

(51) Int. Cl.

| | |
|---|---|
| *B32B 27/08* | (2006.01) |
| *B32B 27/18* | (2006.01) |
| *B32B 27/32* | (2006.01) |
| *B65D 33/01* | (2006.01) |
| *B65D 81/28* | (2006.01) |
| *B65D 85/34* | (2006.01) |
| *A23B 7/153* | (2006.01) |
| *B32B 3/26* | (2006.01) |
| *B65B 25/02* | (2006.01) |
| *B65D 65/40* | (2006.01) |
| *B65D 81/22* | (2006.01) |
| *A23B 7/148* | (2006.01) |

(52) U.S. Cl.
CPC .............. *A23B 7/153* (2013.01); *A23B 7/148* (2013.01); *B32B 3/266* (2013.01); *B32B 27/08* (2013.01); *B32B 27/18* (2013.01); *B32B 27/32* (2013.01); *B65B 25/02* (2013.01); *B65D 33/01* (2013.01); *B65D 65/40* (2013.01); *B65D 81/22* (2013.01); *B65D 81/28* (2013.01); *B65D 85/34* (2013.01); *B65D 85/345* (2013.01); *A23V 2002/00* (2013.01); *B32B 2250/03* (2013.01); *B32B 2250/242* (2013.01); *B32B 2270/00* (2013.01); *B32B 2307/412* (2013.01); *B32B 2307/724* (2013.01); *B32B 2307/726* (2013.01); *B32B 2410/00* (2013.01); *B32B 2439/46* (2013.01); *B32B 2439/70* (2013.01); *Y10T 428/31663* (2015.04); *Y10T 428/31913* (2015.04)

(58) Field of Classification Search
CPC ......... B32B 27/08; B32B 27/06; B32B 27/18; B32B 27/32; B32B 2250/02; B32B 2250/0242; B32B 2250/03; B32B 2250/04; B32B 2250/05; B32B 2439/70; B65D 65/38; B65D 65/40; Y10T 428/31913; Y10T 428/2495
USPC ................................................ 428/35.2, 35.7
See application file for complete search history.

(56) References Cited

U.S. PATENT DOCUMENTS

| | | | | |
|---|---|---|---|---|
| 4,078,659 | A | * | 3/1978 | Rensner .................. B65B 61/14 206/432 |
| 5,001,015 | A | * | 3/1991 | Havens ...................... C08J 5/18 428/516 |
| 5,306,549 | A | | 4/1994 | Hideo et al. |
| 6,268,044 | B1 | * | 7/2001 | Grangette ............... B32B 27/32 428/213 |
| 2008/0113133 | A1 | * | 5/2008 | Fackler ............... B29C 47/0021 428/35.7 |
| 2012/0067767 | A1 | * | 3/2012 | Shirrell .................. B32B 27/32 206/525 |

FOREIGN PATENT DOCUMENTS

| | | |
|---|---|---|
| EP | 0705687 | 4/1996 |
| EP | 0729831 | 9/1996 |
| JP | 2003/321613 | 11/2003 |
| JP | 2004/216825 | 8/2004 |
| JP | 2007/045885 | 2/2007 |

OTHER PUBLICATIONS

MP Biomedicals, available online at https://www.mpbio.com/product.php?pid=04806576 on Nov. 1, 2017.*
PCT International Search Report for PCT/US2015/032163, dated Jul. 10, 2015.

* cited by examiner

*Primary Examiner* — Lee E Sanderson
(74) *Attorney, Agent, or Firm* — Barnes & Thornburg LLP

(57) ABSTRACT

The present invention is based on the surprising result that packaging materials comprising at least one moisture modulating agent can significantly reduce moisture loss, physical damage, and/or microbial decay of produce. Inclusion of such moisture modulating agent(s) can provide at least one of the following advantages: (1) less disease development as compared to traditional packaging material; (2) fresher, firmer produce with less rot or defects (for example cracking or splitting); (3) better see-through as compared to traditional packaging material; (4) preventing the humidity inside the bag from coalescing into large drops or even pools of water (i.e., less water accumulation or moisture condensation within the package); and (5) providing sufficient gas transmission of oxygen ($O_2$)/carbon dioxide ($CO_2$) and/or a quality management agent, for example ethylene or 1-MCP, for better quality control during storage at room temperature (shelf life).

18 Claims, No Drawings

COMPOSITIONS AND METHODS FOR PACKAGING PRODUCE

CROSS-REFERENCE

This application claims the benefit of priority under 35 U.S.C. § 119(e) of U.S. provisional patent application Nos. 62/014,258 filed Jun. 19, 2014, the content of which is incorporated by reference in its entirety.

BACKGROUND OF THE INVENTION

Produce, including fruits and vegetables, may generate moisture during storage via respiration. Some produce has relatively high respiration rates and others have relatively low respiration rates. Currently, packaging of high respiration fruits and vegetables cannot be done in polyolefin-based films without the risk of decay and peel/skin damage or other physiological damage due to the accumulation of water droplets and pooled water inside the bags. As a result, other materials with very high water vapor transmission rates must be utilized, such as nylon films/bags. Nylon is a material with a high water vapor transmission rate, and films are made with this material to help minimize or remove condensation from high respiring and/or moisture sensitive produce, for example bananas. However, nylon bags have a drawback because they are more expensive to manufacture and do not have very good gas (for example oxygen and carbon dioxide) transmission properties which may play an important role for shelf life storage. Also nylon-based films are not efficient in transmitting ethylene-like gases that help trigger ripening in climacteric fruits or vegetables or 1-methylcyclopropene-like gases for quality management. 1-Methylcyclopropene (1-MCP) is a known antagonist to the ethylene receptor.

Thus, there remains a need to develop cheap and effective packaging material for produce, especially for high respiring and/or moisture sensitive produce, against moisture loss, physical damage, and/or microbial decay.

SUMMARY OF THE INVENTION

The present invention is based on the surprising result that packaging materials comprising at least one moisture modulating agent can significantly reduce moisture loss, physical damage, and/or microbial decay of produce. Inclusion of such moisture modulating agent(s) can provide at least one of the following advantages: (1) less disease development as compared to traditional packaging material; (2) fresher, firmer produce with less rot or defects (for example cracking or splitting); (3) better see-through as compared to traditional packaging material; (4) preventing the humidity inside the bag from coalescing into large drops or even pools of water (i.e., less water accumulation or moisture condensation within the package); and (5) providing sufficient gas transmission of oxygen ($O_2$)/carbon dioxide ($CO_2$) and/or a quality management agent, for example ethylene or 1-MCP, for better quality control during storage at room temperature (shelf life).

In some embodiments, packaging materials provided herein may use polyethylene films (which is cheaper to manufacture relative to nylon) without the risk of produce damage due to accumulation of water droplets and pooled water inside the bag. In another embodiment, the packaging materials provided herein may include polyolefin-based films or a specialized structure engineered with a blend of polyethylene in combination with vinyl acetate and other additives, for example slip and/or antiblock, to reduce moisture condensation and accumulation in the package (for example a bag) and/or the product, thereby reducing the risk of produce damage due to accumulation of water droplets.

In one aspect, provided is a packaging material for produce. The packaging material comprises:
(a) a first layer comprising at least one polymer of 40% to 60% by weight, a low density polyethylene (LDPE) of 30% to 50% by weight, and at least one moisture modulating agent;
(b) a second layer comprising at least one polymer of 40% to 60% by weight, a higher content of LDPE than the first layer and the third layer, and at least one moisture modulating agent; and
(c) a third layer comprising at least one polymer of 40% to 60% by weight and a LDPE of 30% to 50% by weight.

In one embodiment, the third layer is on the outside of the packaging material, for example a bag. In another embodiment, the third layer does not comprise a moisture modulating agent. In another embodiment, the polymers used in the first layer, the second layer, and the third layer are identical. In another embodiment, the at least one polymer used in the first layer, the second layer, and/or the third layer comprises a polyolefin-based polymer. In another embodiment, the moisture modulating agent is loaded in the second layer (or the core layer) and may sweep slowly to other layers post extrusion.

In one embodiment, the moisture modulating agents used in the first layer and the second layer are identical. In another embodiment, the at least one moisture modulating agent of the first layer or second layer comprises a compound having a molecular weight no greater than 20,000 Daltons and having three or more polyoxyethylene chains. In another embodiment, the at least one moisture modulating agent of the first layer or second layer is selected from the group consisting of a siloxane, hydrofluoroethers, alkoxylated ethers, sorbitan esters, polyoxyalkylene fatty acid esters, alkoxylated phenols, mixed mono-, di-, or triglycerides, fatty acid esters of polyhydroxy alcohols and other polyalkoxylated compounds. In another embodiment, the at least one moisture modulating agent comprises a product sold under the trademark Polybatch®.

In one embodiment, the produce is a high respiring and/or moisture sensitive produce. Moisture sensitive produce is defined as any produce that has the potential to allow growth of resident spores or bacteria to proliferate during high water vapor or water accumulation environment. In a further embodiment, the high respiring and/or moisture sensitive produce is selected from the group consisting of apricot, avocado, banana, cherry, melon, papaya, peach, nectarine, pear, plum, fig, cabbage, carrot, lettuce, pepper, and tomato.

In another aspect, provided is a multi-layer film or a multi-component fiber. The multi-layer film or multi-component fiber comprises the packaging materials provided herein. The multi-layer film, multi-component fiber, and/or packaging materials provided herein may further contain micro or macro perforations. Micro perforations may have a mean diameter of 50 to 500 micrometers and macro perforations may have a mean diameter of 3,000 to 30,000 micrometers.

In one embodiment, the multi-layer film, multi-component fiber, or packaging materials provided has a thickness between 0.5 and 10 mils, or between 1 and 5 mils. In another embodiment, the multi-layer film, multi-component fiber, or packaging materials provided has a $CO_2$ transmission rate between 15,000 and 120,000 cubic centimeters per square meter per day (cc/($m^2$·day)), or between 75,000 and 78,000 cc/(m²·day). In another embodiment, the multi-layer film, multi-component fiber, or packaging materials provided has an $O_2$ transmission rate between 3,000 and 15,000 cc/(m²·day), or between 10,000 and 12,500 cc/(m²·day). In another embodiment, the multi-layer film, multi-component fiber, or packaging materials provided has a water vapor transmission rate between 30 and 300 grams per square meter per day (g/(m²·day)), or between 60 and 100 g/(m²·day). In another embodiment, the multi-layer film, multi-component fiber, or packaging material provided has a spencer strength between 300 and 400 grams per mil (g/mil). In another embodiment, the multi-layer film, multi-component fiber, or packaging materials provided has a transmission rate for 1-methylcyclopropene (1-MCP) between 60,000 and 480,000 cubic centimeters per square meter per day (cc/(m²·day)), or between 200,000 and 350,000 cc/(m²·day).

In another aspect, provided is a method of handling produce. The method comprises:
(a) providing a packaging material comprising a first layer, a second layer, and a third layer, wherein the first layer and second layer comprise at least one moisture modulating agent; and
(b) storing the produce in the packaging material for a storage period between three days and twenty days, where there is at least three-fold, five-fold, ten-fold, or twenty-fold less water accumulation in the packaging material after the storage period as compared to a reference packaging material which does not comprise a moisture modulating agent.

In one embodiment, the packaging material comprises:
(a) a first layer comprising at least one polymer of 40% to 60% by weight, a low density polyethylene (LDPE) of 30% to 50% by weight, and at least one moisture modulating agent;
(b) a second layer comprising at least one polymer of 40% to 60% by weight, a higher content of LDPE than the first layer and the third layer, and at least one moisture modulating agent; and
(c) a third layer comprising at least one polymer of 40% to 60% by weight and a LDPE of 30% to 50% by weight.

In one embodiment, the third layer does not comprise a moisture modulating agent. In a further embodiment, the polymers used in the first layer, the second layer, and the third layer are identical. In another further embodiment, the at least one polymer used in the first layer, the second layer, and/or the third layer comprises a polyolefin-based polymer.

In one embodiment, the moisture modulating agents used in the first layer and the second layer are identical. In another embodiment, the at least one moisture modulating agent of the first layer or second layer comprises a compound having a molecular weight no greater than 20,000 Daltons and having three or more polyoxyethylene chains. In another embodiment, the at least one moisture modulating agent of the first layer or second layer is selected from the group consisting of a siloxane, hydrofluoroethers, alkoxylated ethers, sorbitan esters, polyoxyalkylene fatty acid esters, alkoxylated phenols, mixed mono-, di-, or triglycerides, fatty acid esters of polyhydroxy alcohols and other polyalkoxylated compounds. In another embodiment, the at least one moisture modulating agent comprises a product sold under the trademark Polybatch®.

In one embodiment, the produce is a high respiring and/or moisture sensitive produce. In a further embodiment, the high respiring and/or moisture sensitive produce is selected from the group consisting of apricot, avocado, banana, cherry, melon, papaya, peach, nectarine, pear, plum, fig, cabbage, carrot, lettuce, pepper, and tomato.

In another aspect, provided is a method of preparing a multi-layer packaging material. The method comprises adding at least one moisture modulating agent into at least one layer of the multi-layer packaging material when the layers are formed.

In one embodiment, the multi-layer packaging material comprises:
(a) a first layer comprising at least one polymer of 40% to 60% by weight, a low density polyethylene (LDPE) of 30% to 50% by weight, and at least one moisture modulating agent;
(b) a second layer comprising at least one polymer of 40% to 60% by weight, a higher content of LDPE than the first layer and the third layer, and at least one moisture modulating agent; and
(c) a third layer comprising at least one polymer of 40% to 60% by weight and a LDPE of 30% to 50% by weight.

In one embodiment, the third layer does not comprise a moisture modulating agent. In a further embodiment, the polymers used in the first layer, the second layer, and the third layer are identical. In another further embodiment, the at least one polymer used in the first layer, the second layer, and/or the third layer comprises a polyolefin-based polymer.

In one embodiment, the moisture modulating agents used in the first layer and the second layer are identical. In another embodiment, the at least one moisture modulating agent of the first layer or second layer comprises a compound having a molecular weight no greater than 20,000 Daltons and having three or more polyoxyethylene chains. In another embodiment, the at least one moisture modulating agent of the first layer or second layer is selected from the group consisting of a siloxane, hydrofluoroethers, alkoxylated ethers, sorbitan esters, polyoxyalkylene fatty acid esters, alkoxylated phenols, mixed mono-, di-, or triglycerides, fatty acid esters of polyhydroxy alcohols and other polyalkoxylated compounds. In another embodiment, the at least one moisture modulating agent comprises a product sold under the trademark Polybatch®.

In another aspect, provided is a respiratory moisture controlling bag for produce. The respiratory moisture controlling bag comprises:
(a) two sidewalls;
(b) a closed bottom edge; and
(c) two closed side edges.

In one embodiment, each of said closed edges joining a respective edge of each sidewall to a corresponding edge of the other of said sidewalls. In another embodiment, said bag having an effective breathable film area of about sixty square inches/pound of produce or less to allow the controlled respiration of produce packaged within said bag to maintain a bag atmosphere inside of said bag when closed with such produce a relative humidity of >90% during at least a portion of transit, ripening, distribution, or holding processes of said produce. In a further embodiment, the effective breathable film area is between forty and sixty square inches/pound of produce. In another embodiment, the relative humidity is between 92% and 100%. In another embodiment, the closed bag packaged with produce further showing negligible visible signs of free water accumulation during five to ten days of holding at room temperature. In a further embodiment, the closed bag packaged with produce further showing negligible visible signs of free water accumulation during about eight days of holding at room temperature.

In a further embodiment, the bag comprises a polymeric film having an $O_2$ transmission of 300-5000 cubic centimeters per pound of packaged produce. In another further embodiment, the bag comprises a polymeric film having a $CO_2$ transmission of 1000-30,000 cubic centimeter per pound of packaged produce. In another further embodiment, the bag comprises a polymeric film having a 1-MCP transmission of 1000-100,000 cubic centimeters per pound of packaged produce. In another further embodiment, the bag comprises a polymeric film having a water vapor transmission of 1-15 cubic centimeters per pound of packaged produce.

In another embodiment, the bag comprises a perforated polymeric film, the perforations have a mean diameter of 3,000-30,000 micrometers, and the bag has 0.1 to 3 perforations per pound of packaged produce. In another embodiment, the bag comprises a perforated polymeric film, the perforations have a mean diameter of 3,000-30,000 micrometers, and the bottom and top edges of the bag are left open (not closed or sealed) during at least a portion of the transit, ripening, distribution, or holding processes of the produce. In another embodiment, the bag comprises a perforated f polymeric film, the perforations have a mean diameter of 50-500 micrometers, and the total area of the perforations in the polymer film is between 50,000 and 6,000,000 square micrometers per kilogram of packaged produce.

In another embodiment, the bag comprises a breathable polymeric film controlling respiration of packaged produce and leading to an atmosphere inside of the bag with 3-16% $O_2$ and 5-20% $CO_2$, during at least a portion of the transit, ripening, distribution, or holding processes of the produce. In another embodiment, the bag comprises a polymeric film permeable to ripening controlling agents in a closed state under commercial conditions. In a further embodiment, the ripening controlling agents comprise ethylene and 1-MCP. In another further embodiment, the ripening controlling agents consist of ethylene and 1-MCP.

DETAILED DESCRIPTION OF THE INVENTION

As used herein, "banana" refers to any member of the genus *Musa*, including, for example, bananas and plantains.

When a compound is described herein as being present as a gas in an atmosphere at a certain concentration using the unit "ppm," the concentration is given as parts by volume of that compound per million parts by volume of the atmosphere. Similarly, "ppb" denotes parts by volume of that compound per billion parts by volume of the atmosphere.

As used herein, a "film" is an object made of a polymer that is much smaller in one dimension (the "thickness") than in the other two dimensions and that has a relatively uniform thickness. As used herein, a polymeric film is a film, the composition of which may contain 50% or more polymer by weight based on the weight of the film.

As used herein, a "polymeric film" is an object made of polymer that is much smaller in one dimension (the "thickness") than in the other two dimensions and that has a relatively uniform thickness.

A "polymer," as used herein, is a relatively large molecule made up of repeated units of the reaction products of monomers. Polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

As used herein, a "monomer" is a compound that has one or more carbon-carbon double bond that is capable of participating in a polymerization reaction. As used herein, an "olefin monomer" is a monomer, the molecules of which contain only atoms of carbon and hydrogen. As used herein, "polar monomer" is a monomer, the molecules of which contain one or more polar group. Polar groups include, for example, hydroxyl, thiol, carbonyl, carbon-sulfur double bond, carboxyl, sulfonic acid, ester linkages, and combinations thereof. As used herein, when a monomer is reacted with other monomers to form a polymer, the residue of that monomer in the resulting polymer is the "polymerized unit" of that monomer.

As used herein, a "bag" is a flexible enclosure made from a packaging material. A bag has one opening; it is possible to place one or more objects inside the bag and then close the opening. It is not necessary that the bag be able to support the weight of the object or objects inside it. A plastic bag is a bag, the composition of which may contain 50% or more polymer by weight based on the weight of the bag.

A "rectangular" bag is a bag for which it is possible to lay the bag on a flat surface and flatten the bag so that it exists as two identical flat layers, one on top of the other, and the horizontal shape of those two layers is a rectangle. When a rectangular bag is laid down that way, the edge of the opening forms one side of the rectangle; that edge is known herein as the top of the bag. The edge opposite to the top of the bag is known herein as the bottom of the bag.

It may be noted that only a portion of the bag containing the produce may be utilized for gas or water vapor exchange. Such portion of the bag is referred as effective breathable portion for this invention. The film area in the effective breathable portion of the package is calculated and expressed in units of square inches/pound (lb.) of produce packaged. In one embodiment, the effective breathable film area is 60 square inches or less.

As used herein, when a ratio is said to be "X:1 or higher," it is meant that the ratio is Y:1, where Y is greater than or equal to X. For example, if it is stated herein that a ratio is "5:1 or higher," it is meant that that ratio may be, for example, 5:1 or 6:1 or 100:1 but may not be, for example, 4:1 or 0.1:1. Similarly, when a ratio is said to be "W:1 or lower," it is meant that the ratio is Z:1, where Z is less than or equal to W. For example, if it is stated herein that a ratio is "20:1 or lower," it is meant that that ratio may be, for example, 20:1 or 19:1 or 1:1 but may not be, for example, 21:1 or 90:1.

An enclosure/packaging material that is designed to contain produce (i.e., fruits or vegetables) in an atmosphere other than normal ambient air is called a "Modified Atmosphere Package" (MAP). A passive MAP takes advantage of the fact that some produce (bananas, for example) respire after harvest. Thus such produce, when placed in an enclosure, consumes oxygen and produces carbon dioxide among other processes. The MAP can be designed so that diffusion through the solid exterior surfaces of the MAP and passage of gas through any perforations that may be present in the exterior surface of the MAP maintain preferred levels of oxygen, carbon dioxide, and optionally other gases (such as, for example, water vapor or ethylene or both).

As used herein, the phrase "high respiring produce" and/or "moisture sensitive produce" refers to fruits and vegetables which can generally have a respiration rate exceeding 20 milligrams $CO_2$ per kilogram per hour (mg $CO_2$ $kg^{-1}$ $h^{-1}$) at 5° C. or higher temperature, and/or have a potential to evolve water vapor through transpiration process. Typical high respiring/moisture sensitive produce includes, but is not limited to, berries, avocado, artichoke, banana, snap bean, brussels sprouts, cut flowers, asparagus, broccoli, mushroom, pea, spinach, and sweet corn. In principle, higher temperature can increase the produce's respiration rate up to two- to three-fold. Thus whether a particular fruit is high respiring and/or moisture sensitive may depend on its storage temperature. Examples of high respiring/moisture sensitive produce depending on its storage temperature includes, but is not limited to, apricot, banana, cherry, melon, papaya, peach, nectarine, pear, plum, fig, cabbage, carrot, lettuce, pepper, and tomato.

It is useful to characterize the inherent gas transmission characteristics of a polymeric film. By "inherent" it is meant the properties of the film itself, in the absence of any perforations or other alterations. Industry standard methods (American Society for Testing and Materials) ASTM D3985 for $O_2$, ASTM 1434 for $CO_2$, and ASTM F1249 for water ($H_2O$) can readily be used to characterize the gas transmission characteristics of a polymer film.

The practice of the present invention optionally involves the use of one or more cyclopropene compound. As used herein, a cyclopropene compound is any compound with the formula

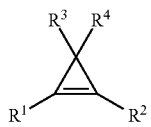

where each $R^1$, $R^2$, $R^3$ and $R^4$ is independently selected from the group consisting of H and a chemical group of the formula:

$$-(L)_n-Z$$

where n is an integer from 0 to 12. Each L is a bivalent radical. Suitable L groups include, for example, radicals containing one or more atoms selected from H, B, C, N, O, P, S, Si, or mixtures thereof. The atoms within an L group may be connected to each other by single bonds, double bonds, triple bonds, or mixtures thereof. Each L group may be linear, branched, cyclic, or a combination thereof. In any one R group (i.e., any one of $R^1$, $R^2$, $R^3$ and $R^4$) the total number of heteroatoms (i.e., atoms that are neither H nor C) is from 0 to 6. Independently, in any one R group the total number of non-hydrogen atoms is 50 or less. Each Z is a monovalent radical. Each Z is independently selected from the group consisting of hydrogen, halo, cyano, nitro, nitroso, azido, chlorate, bromate, iodate, isocyanato, isocyanido, isothiocyanato, pentafluorothio, and a chemical group G, wherein G is a 3- to 14-membered ring system.

The $R^1$, $R^2$, $R^3$, and $R^4$ groups are independently selected from the suitable groups. Among the groups that are suitable for use as one or more of $R^1$, $R^2$, $R^3$, and $R^4$ are, for example, aliphatic groups, aliphatic-oxy groups, alkylphosphonato groups, cycloaliphatic groups, cycloalkylsulfonyl groups, cycloalkylamino groups, heterocyclic groups, aryl groups, heteroaryl groups, halogens, silyl groups, and mixtures and combinations thereof. Groups that are suitable for use as one or more of $R^1$, $R^2$, $R^3$, and $R^4$ may be substituted or unsubstituted.

Among the suitable $R^1$, $R^2$, $R^3$, and $R^4$ groups are, for example, aliphatic groups. Some suitable aliphatic groups include, for example, alkyl, alkenyl, and alkynyl groups. Suitable aliphatic groups may be linear, branched, cyclic, or a combination thereof. Independently, suitable aliphatic groups may be substituted or unsubstituted.

As used herein, a chemical group of interest is said to be "substituted" if one or more hydrogen atoms of the chemical group of interest is replaced by a substituent.

Also among the suitable $R^1$, $R^2$, $R^3$, and $R^4$ groups are, for example, substituted and unsubstituted heterocyclyl groups that are connected to the cyclopropene compound through an intervening oxy group, amino group, carbonyl group, or sulfonyl group; examples of such $R^1$, $R^2$, $R^3$, and $R^4$ groups are heterocyclyloxy, heterocyclylcarbonyl, diheterocyclylamino, and diheterocyclylaminosulfonyl.

Also among the suitable $R^1$, $R^2$, $R^3$, and $R^4$ groups are, for example, substituted and unsubstituted heterocyclic groups that are connected to the cyclopropene compound through an intervening oxy group, amino group, carbonyl group, sulfonyl group, thioalkyl group, or aminosulfonyl group; examples of such $R^1$, $R^2$, $R^3$, and $R^4$ groups are diheteroarylamino, heteroarylthioalkyl, and diheteroarylaminosulfonyl.

Also among the suitable $R^1$, $R^2$, $R^3$, and $R^4$ groups are, for example, hydrogen, fluoro, chloro, bromo, iodo, cyano, nitro, nitroso, azido, chlorate, bromate, iodate, isocyanato, isocyanido, isothiocyanato, pentafluorothio, acetoxy, carboethoxy, cyanato, nitrato, nitrito, perchlorato, allenyl, butylmercapto, diethylphosphonato, dimethylphenylsilyl, isoquinolyl, mercapto, naphthyl, phenoxy, phenyl, piperidino, pyridyl, quinolyl, triethylsilyl, trimethylsilyl, and substituted analogs thereof.

As used herein, the chemical group G is a 3- to 14-membered ring system. Ring systems suitable as chemical group G may be substituted or unsubstituted; they may be aromatic (including, for example, phenyl and napthyl) or aliphatic (including unsaturated aliphatic, partially saturated aliphatic, or saturated aliphatic); and they may be carbocyclic or heterocyclic. Among heterocyclic G groups, some suitable heteroatoms are, for example, nitrogen, sulfur, oxygen, and combinations thereof. Ring systems suitable as chemical group G may be monocyclic, bicyclic, tricyclic, polycyclic, spiro, or fused; among suitable chemical group G ring systems that are bicyclic, tricyclic, or fused, the various rings in a single chemical group G may be all the same type or may be of two or more types (for example, an aromatic ring may be fused with an aliphatic ring).

In one embodiment, one or more of $R^1$, $R^2$, $R^3$, and $R^4$ is hydrogen or $C_1$-$C_{10}$ alkyl. In another embodiment, each of $R^1$, $R^2$, $R^3$, and $R^4$ is hydrogen or $C_1$-$C_8$ alkyl. In another embodiment, each of $R^1$, $R^2$, $R^3$, and $R^4$ is hydrogen or $C_1$-$C_4$ alkyl. In another embodiment, each of $R^1$, $R^2$, $R^3$, and $R^4$ is hydrogen or methyl. In another embodiment, $R^1$ is $C_1$-$C_4$ alkyl and each of $R^2$, $R^3$, and $R^4$ is hydrogen. In another embodiment, $R^1$ is methyl and each of $R^2$, $R^3$, and $R^4$ is hydrogen, and the cyclopropene compound is known herein as 1-methylcyclopropene or "1-MCP."

In another embodiment, the cyclopropene is of the formula:

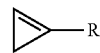

wherein R is a substituted or unsubstituted alkyl, alkenyl, alkynyl, cycloalkyl, cycloalkylalkyl, phenyl, or naphthyl group; wherein the substituents are independently halogen, alkoxy, or substituted or unsubstituted phenoxy. In one embodiment, R is $C_1$-$C_8$ alkyl. In another embodiment, R is methyl.

In another embodiment, the cyclopropene is of the formula:

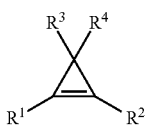

wherein $R^1$ is a substituted or unsubstituted $C_1$-$C_4$ alkyl, $C_1$-$C_4$ alkenyl, $C_1$-$C_4$ alkynyl, $C_3$-$C_6$ cycloalkyl, cycloalkylalkyl, phenyl, or napthyl group; and $R^2$, $R^3$, and $R^4$ are hydrogen. In another embodiment, the cyclopropene comprises 1-methylcyclopropene (1-MCP).

When a cyclopropene compound is used, in some embodiments the concentration of the cyclopropene compound in the atmosphere is 0.5 ppb or higher; 1 ppb or higher; 10 ppb or higher; or 100 ppb or higher. In some embodiments, the concentration of the cyclopropene compound is 100 ppm or lower, 50 ppm or lower, 10 ppm or lower, or 5 ppm or lower.

One useful way to characterize the packaging materials provided is the gas transmission rate. In some embodiments, the rate of transmission of carbon dioxide ($CO_2$) is, in units of cubic centimeters per day, 15,000 or higher; 20,000 or higher; or 30,000 or higher. In some embodiments, the rate of transmission of $CO_2$ is, in units of cubic centimeters per day, 120,000 or lower; 100,000 or lower; or 80,000 or lower.

In some embodiments, the rate of transmission of oxygen ($O_2$) for the packaging materials provided is, in units of cubic centimeters per day, 3,000 or higher; 4,000 or higher; or 8,000 or higher. In some embodiments, the rate of transmission of $O_2$ is, in units of cubic centimeters per day, 15,000 or lower; 12,500 or lower; or 10,000 or lower.

In some embodiments, the rate of transmission of 1-MCP for the packaging materials provided is, in units of cubic centimeters per day, 60,000 or higher; 80,000 or higher; or 100,000 or higher. In some embodiments, the rate of transmission of 1-MCP is, in units of cubic centimeters per day, 480,000 or lower; 400,000 or lower; or 350,000 or lower.

In some embodiments, the rate of transmission of water vapor for the packaging materials provided is, in units of grams per day, 30 or higher; 50 or higher; or 60 or higher. In some embodiments, the rate of transmission of water vapor is, in units of grams per day, 300 or lower; 200 or lower; or 150 or lower.

In some embodiments, the polymer compositions of the packaging materials provided may contain one or more copolymers of an olefin monomer with a polar monomer. Suitable copolymers of an olefin monomer with a polar monomer include, for example, such polymers available from DuPont product sold under the trademark Elvax™ resins. Preferred are copolymers of ethylene with one or more polar monomer. Preferred polar monomers are vinyl acetate, methyl acrylate, ethyl acrylate, butyl acrylate, acrylic acid, methacrylic acid, and mixtures thereof. Preferred polar monomers contain one or more ester linkage; more preferred is vinyl acetate. Among copolymers of ethylene with one or more polar monomer, the preferred amount of polar monomer is, by weight based on the weight of the copolymer, 1% or more; more preferably 2% or more; more preferably 5% or more. Among copolymers of ethylene with one or more polar monomer, the preferred amount of polar monomer is, by weight based on the weight of the copolymer, 25% or less; more preferably 20% or less; more preferably 15% or less.

In some embodiments, the polymer compositions of the packaging materials provided may contain one or more additional polymer. Some suitable polymer compositions include, for example, polyolefins, polyvinyls, polystyrenes, polydienes, polysiloxanes, polyamides, vinylidene chloride polymers, vinyl chloride polymers, copolymers thereof, blends thereof, and laminations thereof. Suitable polyolefins include, for example, polyethylenes, polypropylenes, copolymers thereof, blends thereof, and laminations thereof. Suitable polyethylenes include, for example, low density polyethylene, ultralow density polyethylene, linear low density polyethylene, metallocene-catalyzed polyethylene, copolymers of ethylene with polar monomers, medium density polyethylene, high density polyethylene, copolymers thereof and blends thereof. Suitable polypropylenes include, for example, polypropylene and oriented polypropylene. In some embodiments, low density polyethylene is used. In some embodiments, a copolymer of styrene and butadiene is used. Preferred are polyolefins; more preferred are polyethylenes, metallocene-catalyzed polyethylenes, ultralow density polyethylenes, and mixtures thereof.

In one embodiment, the amount of copolymer, by weight based on the weight of the sum of copolymer and polymer, is 10% or more; more preferably 14% or more. Preferably, the amount of copolymer, by weight based on the weight of the sum of copolymer and polymer, is 28% or less; more preferably 25% or less.

In another embodiment, the sum of the weight of copolymer and the weight of polymer is, based on the total weight of the polymeric film, 75% or more; more preferably 85% or more.

It may be useful to characterize the weight of polymerized units of polar monomer in copolymer as a percentage of the total weight of the polymeric film. In some embodiments, the amount of polymerized units of polar monomer in copolymer is, by weight based on the weight of the polymeric film is 0.05% or higher; 0.2% or higher; 0.8% or higher; or 1% or higher. In some embodiments, the amount of polymerized units of polar monomer in copolymer is, by weight based on the weight of the polymeric film, 18% or less; 10% or less; 4% or less; or 3% or less.

When it is stated herein that the packaging materials provided comprises polymeric film, it is meant that some or all of the surface area of the packaging materials provided consists of polymeric film, and the film is arranged so that molecules that are capable of diffusing through the polymeric film will diffuse between the inside of the packaging materials provided and the outside of the packaging materials provided in both directions.

In some embodiments, the packaging materials provided have a volume of 20 liters or more; 50 liters or more; or 100 liters or more. In some embodiment, the packaging materials provided have a volume of 1,000 liters or less; 500 liters or less; or 250 liters or less. The volume of the packaging materials provided is considered to be the volume that is available for containing produce when the bag/packaging material has been shut.

In some embodiments, it is contemplated that the packaging materials provided can be chosen or designed so that, when bananas are placed into the enclosure, and the bananas while inside the enclosure, are exposed to ethylene and then to a cyclopropene compound, and finally stored for 10 days at 13.3° C. to 22.0° C., a certain preferred atmosphere will be present in the enclosure. In that preferred atmosphere, the amount of carbon dioxide, by volume based on the volume of the atmosphere inside the enclosure, is 7% or more; more preferably 8% or more. In that preferred atmosphere, the amount of carbon dioxide, by volume based on the volume of the atmosphere inside the enclosure, is 21% or less; more preferably 19% or less. In that preferred atmosphere, the amount of oxygen, by volume based on the volume of the atmosphere inside the enclosure, is 4% or more; more preferably 5% or more. In that preferred atmosphere, the amount of oxygen, by volume based on the volume of the atmosphere inside the enclosure, is 13% or less; more preferably 12.5% or less.

In some embodiments, bananas are harvested and immediately placed into the packaging materials provided. In some embodiments, the time from harvest to placement into the packaging materials provided may be 14 days or less, 7 days or less, or 2 days or less. In some embodiments, harvested bananas are placed into the packaging materials provided prior to shipment, and the harvested bananas remain in the packaging materials provided during shipment. In some embodiments, bananas are shipped to a destination that is near the intended point of sale to consumers. As used herein, "near the intended point of sale to consumers" means a location from which it is capable to transport the bananas to the point of sale to consumers in 5 days or fewer by truck or other surface transportation.

In some embodiments, at the time of packing, air can be sucked out from the void areas using a hand held vacuum pump and then quickly sealed to aid in passive MAP development. Alternatively, in some embodiments, bags can also be subject to predefined atmosphere composition also known as active MAP or held under controlled atmosphere (CA) conditions for long term transit and storage. The commonly used atmospheres for active MAP or CA are 3-5% $O_2$ and 3-5% $CO_2$, by weight based on the weight of the atmosphere.

As defined herein, "chilling-sensitive" produce is produce that loses desirable quality if it is exposed to long periods of temperatures at or below 12° C. For example, bananas and some other tropical produce are chilling-sensitive. As defined herein, "EE" produce is produce that does not ripen desirably until exposed to exogenous ethylene. For example, green bananas as they are normally harvested are EE produce. As defined herein, "HT" produce is produce that does not ripen desirably as long as it is stored below 10° C. and then does ripen normally after exposure to a temperature of 20° C. or higher. For example, avocado and mango are HT produce.

In some embodiments, the packaging materials provided that contain produce are stored for relatively long periods of time, optionally at reduced temperature. Such storage may take place, for example, during shipment of produce from one location to another. In some embodiments, the packaging materials provided that contain produce may be stored for 7 days or more; 10 days or more; or 20 days or more. In other embodiments, the packaging materials provided that contain produce are stored for 50 days or fewer; 40 days or fewer; or 30 days or fewer. In some embodiments, the packaging materials provided that contain chilling-sensitive produce are stored at a temperature of 13° C. or higher. In other embodiments, the packaging materials provided that contain produce may be stored at a temperature of 20° C. or lower; or 15° C. or lower.

In some embodiments, the packaging materials provided that contain EE produce are exposed to an atmosphere that contains ethylene. The temperature for performing exposure to ethylene may be 13.5° C. or higher; or 14° C. or higher. In other embodiments, the temperature for performing exposure to ethylene may be 18.3° C. or lower. The concentration of ethylene in the atmosphere during exposure may be 20 ppm or higher; 50 ppm or higher; or 100 ppm or higher. In other embodiments, the concentration of ethylene in the atmosphere during exposure may be 1,000 ppm or less; 500 ppm or less; or 300 ppm or less.

In some embodiments, the duration of the exposure to ethylene may be 8 hours or more; 16 hours or more; or 20 hours or more. In other embodiments, the duration of the exposure to ethylene may be 48 hours or less; 36 hours or less; or 24 hours or less.

In some embodiments in which HT produce is used, it is preferred to maintain the produce below 15° C. until immediately prior to distribution to retail stores, at which time the produce is preferably kept at 20-22° C. for 24-48 hours.

In some embodiments, the packaging materials provided that contain produce may be exposed to one or more cyclopropene compound as provided herein. In one embodiment, the cyclopropene compound comprises 1-methylcyclopropene (1-MCP). Thus, in some embodiments, the packaging materials provided that contain produce are exposed to an atmosphere that contains molecules, in gaseous form, of one or more cyclopropene compound. In some embodiments, the concentration of cyclopropene compound may be 0.5 ppb or higher; 1 ppb or higher; 10 ppb or higher; or 100 ppb or higher. In other embodiments, the concentration of cyclopropene compound may be 100 ppm or lower; 50 ppm or lower; 10 ppm or lower; or 5 ppm or lower.

In some embodiments, the temperature for performing exposure to a cyclopropene compound may be 8° C. or higher; or 11° C. or higher. In other embodiments, the temperature for performing exposure to a cyclopropene compound may be 18.3° C. or lower.

In some embodiments, the packaging materials provided that contain produce to an atmosphere that contains a cyclopropene compound may be 4 hours or more; 8 hours or more; or 10 hours or more. In other embodiments, the duration of the exposure to the cyclopropene compound may be 24 hours or less; or 18 hours or less.

In some embodiments, the packaging materials provided that contain bananas are exposed to an atmosphere containing a cyclopropene compound when the bananas have a peel color rating of 2.5 to 3.5 on a seven-stage scale. The color of banana peels is rated according to a seven stage rating scale: stage 1 (dark green); stage 2 (all light green); stage 3 (half green and half yellow); stage 4 (more yellow than green); stage 5 (green tips and necks); stage 6 (all yellow; maybe light green necks, no green tips); and stage 7 (yellow flecked with brown). Consumers generally prefer to eat bananas in stage 5 or stage 6.

Those skilled in the art would understand certain variations can exist based on the disclosure provided. Thus, the following examples are given for the purpose of illustrating the invention and shall not be construed as being a limitation on the scope of the invention or claims.

EXAMPLES

Example 1—Polyolefin-Based Packaging Materials

A polyolefin-based formulation/packaging material/film having a three-layered structure (layer A+layer B+layer C) is tested. Elvax™ 3165 (EVA) containing 18% vinyl acetate (VA) and a melt index of 0.7 from DuPont is used. The final VA content in the formulation/packaging material/film makes up 10.08% of the formulation. ATTANE™ makes up about 40% of the low density polyethylene (LDPE) content of the structure. The ultra-low density ethylene/octane copolymer used can provide better optic properties. Representative composition of formulation/packaging material/film is set forth in Table 1.

TABLE 1

Representative composition tested in this example

| Raw Material | Skin 1 15% Layer A wt % | Core 70% Layer B wt % | Skin 2 15% Layer C wt % | % VA |
|---|---|---|---|---|
| Elvax ™ 3165 18% VA 0.7 MI | 56 | 56 | 56 | 10 |
| ATTANE ™ NG 4701G 0.912/0.8 MI | 32 | 43 | 39 | |
| Colortech 10868-129 5% slip 10% AB | 5 | | 5 | |
| Schulman Polybatch ® AF 1088 | 7 | 1 | | |

(wt %—weight percent and VA = vinyl acetate)

The formulation/packaging material/film displays enhanced optical properties and improved gas transmission, including $O_2$, $CO_2$, 1-MCP, and water transmission, as compared to traditional packaging material. Table 2 shows representative test results.

TABLE 2

Representative characteristics of packaging material provided

| | |
|---|---|
| VA content | 8-15% (DU) |
| Thickness | 1-10 mil |
| $CO_2$ transmission rate (cc/m² day) | 75,000-78,000 |
| $O_2$ transmission rate (cc/m² day) | 10,000-12,500 |
| Water vapor transmission rate (g/m² day) | 60-100 |
| Spencer Impact (g/mil) | 1,000-1,600 |
| Tear Strength (g/mil) | 300-400 |
| Puncture test with 4 mm probe, Force for failure, N | 4-7 |
| Puncture test, Stetchability, mm | 20-30 |
| 1-MCP transmission rate (cc/m² day) | 200,000-350,000 |

Forty pound green non-gassed banana are packed as per commercial requirement. Plastic bags (either control bags or bags according to the present invention) are placed in corrugated cardboard boxes lined with kraft paper. A brown diaper paper measuring about 12"×19.5" is placed in each plastic bag. About half of the fruit is lined in two rows on the bottom layer and the plastic bags are folded over the fruit meeting in the middle of the boxes. The kraft paper is then folded on the top of the plastic bags to meet in the middle of the boxes to prevent transit induced damage to the banana. The plastic bags are then folded over the kraft paper, thereby lining the kraft paper, and the rest of the fruit are placed in two layers on the top. Plastic strips (2"×19.5") are placed in-between fruit fingers to avoid scuffing. The bags are then twist tied with rubber band. The 40 lbs. banana boxes are then ripened with approximately 1000 ppm ethylene in a commercial room under commercial ripening conditions at 60-64° F. The boxes are then transferred to room temperature (22-25° C.) conditions without any forced air flow, where they are placed for eight days. On day 8 the fruit is removed from the box, along with the liners. The plastic bags are then taken out and allowed to rest for about one hour to enable pooling of free water in the sealed end. The pooled water is then collected and measured using a measuring cylinder.

Measurement of 1-MCP transmission: The 1-MCP transmission rate of the entire bag is measured using the whole bag method. The bag is supported on a tent frame of known volume, purged with 1-MCP such that the level of 1-MCP inside the bag is between 1-1.5 ppm and then the concentration of 1-MCP depletion is measured versus time. The rate of 1-MCP transmission for the system is calculated by plotting the natural log of the 1-MCP concentration gradient versus time using quasi-isostatic method as described by Lee et al. 2008 (Lee, D. S., Yam, K. L., Piergiovanni, L. "Permeation of gas and vapor," Food Packaging Science and Technology, CRC Press, New York, N.Y., 2008, pp 100-101).

TABLE 3

Comparative results of water accumulation and fruit quality.

| No. | Bag type | Amount of water (mL) | Color | SSR | Fruit firmness (N) |
|---|---|---|---|---|---|
| PM 1-1 | PE bag with 2.5% VA | 50 | 5.0 | 0 | 0.4 |
| PM 1-2 | Packaging material from Tables 1 and 2 | <1 | 4.7 | 0 | 1.2 |

(SSR = sugar spot rating)

Fruit firmness, color and SSR measurement: Firmness is measured using TA-XT2 Texture Analyzer (Stable Micro Systems) with a 5 mm diameter stainless steel cylinder probe. The probe is set to penetrate up to 11 mm into the banana which represents about 75% of the height of the samples with test speed of 1 mm/s and trigger force of 0.05 N. The instrument is calibrated with a 5 kg weight. The Banana is peeled, cut at the center (10 cm) and placed below the stainless steel probe. The maximum force (N) required to overcome the resistance of banana pulp and puncture the fruit is taken as the firmness of the banana. Each cluster of bananas is rated daily for sugar spots. Clusters are rated using the following scale: 0=no spots; 1=few spots; 2=moderate spots; 3=severe spots. Clusters with rating of 0-1 are commercially desirable to consumers. Clusters with ratings of 2-3 are unacceptable to consumers. In the results herein, the average rating for all the clusters in a given treatment group is reported.

The color of banana peels is rated according to a seven stage rating scale: stage 1 (dark green); stage 2 (all light green); stage 3 (half green and half yellow); stage 4 (more yellow than green); stage 5 (green tips and necks); stage 6 (all yellow; maybe light green necks, no green tips); and stage 7 (yellow flecked with brown). Consumers generally prefer to eat bananas in stage 5 or stage 6.

Water accumulation and fruit quality: Forty pounds (40 lbs.) of bananas are packaged using PM 1-1 (Packaging Material control, similar to traditional packaging material) and PM 1-2 (Packaging Material prepared for this example as set forth in Tables 1 and 2). Packaged bananas are ripened for seven days in a commercial room and the quality evaluated. Both sets of the packaged bananas are kept under the same room conditions. The color and sugar spot rating (SSR) scale is based on industry standards and the fruit firmness is measured using a fruit texture analyzer (FTA). Results show that the quality evaluated on day seven is correlated with the amount of water accumulated in the bottom of the packages. Though the appearance of the fruit with respect to color and SSR appears acceptable for both PM 1-1 and PM 1-2, the fruit in the high water environment (i.e., PM 1-1) become too soft and turgid in comparison to the fruit devoid of free water, thereby making the softer fruit less desirable for consumption.

Example 2

PM 2-1 and PM 2-2 serve as control packaging material in this example. A plastic bag is made using a similar method as in Example 1, except a three-layer coextruded is blown to produce film of thickness about 27.7 micrometer (1.09 mil). The volume ratio of the layers is: first layer/second layer/third layer=15/70/15. Each layer is a blend of EVA, m-LLDPE, and, optionally, S-AB-WDA. Compositions of packaging materials provided in this Example, including PM 2-3, PM 2-4, PM 2-5, PM 2-6, and PM 2-7 are shown in Table 4.

PM 2-2 (Packaging Material control 2, commercially sold for banana under U.S. Pat. No. 6,190,710), and PM 2-3 provided in this Example. Packaged bananas are ripened under commercial conditions and the quality evaluated. Both sets of packaged bananas are stored under the same room conditions and the accumulated water is measured. The color and sugar spot rating (SSR) scale is based on industry standards and the fruit firmness is measured using

TABLE 4

Compositions and transmission properties of packaging materials provided in this Example

| Composition | PM 2-3 | PM 2-4 | PM 2-5 | PM 2-6 | PM 2-7 |
|---|---|---|---|---|---|
| EXCEED ™ 1018 enhanced polyethylene resin (Exxon Mobil Chemical), % | 29.5* | 68.5 | 49 | 29.5 | 32* |
| Colortech 10868-12, % | 5 | 5 | 5 | 5 | 5 |
| Schulman polybatch ® 1088, % | 7 | 7 | 7 | 7 | 7 |
| Escorene ® Ultra LD-705.MJ[1] (Exxon Mobil Chemical), % | 58.5 | 19.5 | 39 | 58.5 | 56** |
| VA, % | 7.5 | 2.5 | 5.0 | 7.5 | 10.1 |
| carbon dioxide transmission at 23° C. $cm^3/(100\ in^2$-day) | 5020 | 2375 | 2746 | 3039 | 6002 |
| oxygen transmission at 23° C. $cm^3/(100\ in^2$-day) | 754 | 488 | 494 | 498 | 890 |
| water transmission rate ambient $g/(100\ in^2$-day) | 4.84 | 1.58 | 1.81 | 1.95 | 4.79 |
| 1-MCP transmission rate $cm^3/(100\ in^2$-day) | 18383 | 7838 | 10,240 | 12750 | 20921 |

*PM 2-3 and PM 2-7 use ATTANE ™ NG 4701G ULDPE resin (Dow Chemical Co.).
**PM 2-3 uses Elvax ™ 3165 (DuPont).

Results show the effect of combining ULDPE with vinyl acetate in comparison to metallocene—linear low density polyethylene (m-PE) with vinyl acetate to enhance transmission properties. For example PM 2-7 (ULDPE) in comparison to PM 2-6 (m-PE) shows increased in moisture (water) transmission by almost two and half times. Additional properties and methods of measurement for PM 2-3 are also listed in Table 5.

TABLE 5

Properties of PM 2-3 provided in this Example

| Test | Method* | PM 2-3 |
|---|---|---|
| Thickness micrometer (mil) | ASTM D374 | 27.7 (1.09) |
| Haze, % | ASTM D1003 | 19 |
| Clarity, % | ASTM D1746 | 77.9 |
| 1% Secant Modulus, MD, MPa (psi) | ASTM D882 | 116 (9890) |
| 1% Secant Modulus, TD, MPa (psi) | ASTM D882 | 136 (11,360) |
| Tensile Toughness, MD, MPa (psi) | ASTM D882 | 41.1 (8500) |
| Tensile Toughness, TD, MPa (psi) | ASTM D882 | 56.0 (9310) |
| Elmendorf Tear, MD, g/25 micrometer (g/mil) | ASTM D1922 | 44 |
| Elmendorf Tear, TD, g/25 micrometer (g/mil) | ASTM D1922 | 346 |
| Spencer impact, g/25 micrometer (g/mil) | ASTM D3420 | 1380 |
| carbon dioxide transmission at 100% MOCON PERMATRAN-C ™ 4/41 23° C. $cm^3/(100\ in^2$-day) | ASTM F2476 | 5020 |
| oxygen transmission at 100% MOCON OX-TRAN 23.1° C. $cm^3/(100\ in^2$-day) | ASTM D3985 | 754 |
| water transmission rate MOCON PERMATRAN-W WVTR 37.8° C. ambient $g/(100\ in^2$-day) | ASTM D1249 | 4.84 |
| 1-MCP transmission rate $cm^3/(100\ in^2$-day) | Modified Lee et. al., 2008 | 18383 |

*ASTM methods are published by the American Society for Testing and Materials, West Conshohocken, PA, USA.

Forty pounds (40 lbs.) of bananas are packaged using PM 2-1 (Packaging Material control 1, PE bag with 2.5% VA), a fruit texture analyzer (FTA). Results are shown in Table 6 where the % tip rot on day seven is correlated with the amount of water accumulated in the bottom of the packages. Though the appearance of the fruit with respect to color and SSR appears acceptable for all PM 2-1, PM 2-2 and PM 2-3, the fruit in the high water environment (i.e., PM 2-1 and PM 2-2) become too soft and turgid in comparison to the fruit devoid of free water, thereby making the softer fruit less desirable for consumption.

TABLE 6

Comparative results of water accumulation and fruit quality.

| Test | Bag type | Amount of water (mL) | % Tip rot |
|---|---|---|---|
| PM 2-1 | PE bag with 2.5% VA | 50 | >20% |
| PM 2-2 | Commercial bag | 19 | 20% |
| PM 2-3 | Packaging material from Tables 4 and 5 | <1 | <6% |

We claim:
1. A packaging material for produce comprising:
(a) a first layer comprising at least one polymer of 40% to 60% by weight, a low density polyethylene (LDPE) of 30% to 50% by weight, and one or more first layer moisture modulating agents;
(b) a second layer comprising at least one polymer of 40% to 60% by weight, a higher content of LDPE than the first layer and the third layer, and at least one moisture modulating agent; and one or more second layer moisture modulating agents,
wherein the one or more first layer moisture modulating agents and the one or more second layer moisture modulating agents are compounds having a molecular weight no greater than 20,000 Daltons and having three or more polyoxyethylene chains,

(c) a third layer comprising at least one polymer of 40% to 60% by weight and a LDPE of 30% to 50% by weight, wherein the packaging material is optionally sealed, wherein the sealed packaging material comprises produce, and wherein the one or more first layer moisture modulating agent and the one or more second layer moisture modulating agent within the sealed packaging material provide improvements to the produce selected from the group consisting of reduced water accumulation in the packaging material, increased produce firmness, and reduced disease development in produce as compared to packaging material that does not comprise a moisture modulating agent.

2. The packaging material of claim 1, wherein the third layer does not comprise a moisture modulating agent.

3. The packaging material of claim 1, wherein the polymers used in the first layer, the second layer, and the third layer are identical.

4. The packaging material of claim 1, wherein the at least one polymer used in the first layer, the second layer, and/or the third layer comprises a polyolefin-based polymer.

5. The packaging material of claim 1, wherein the moisture modulating agents used in the first layer and the second layer are identical.

6. A multi-layer film or a multi-component fiber comprising the packaging material of claim 1.

7. The packaging material of claim 1, wherein the produce is a high respiring produce or a moisture sensitive produce.

8. The packaging material of claim 7, wherein the high respiring produce or the moisture sensitive produce is selected from the group consisting of apricot, avocado, banana, cherry, melon, papaya, peach, nectarine, pear, plum, fig, cabbage, carrot, lettuce, pepper, and tomato.

9. The packaging material of claim 1, wherein the one or more first layer moisture modulating agents and the one or more second layer moisture modulating agents reduce water accumulation within the sealed packaging material by at least ten-fold as compared to packaging material that does not comprise a moisture modulating agent.

10. The packaging material of claim 1, wherein the thickness of the packaging material is between about 0.5 mil and about 10 mil.

11. The packaging material of claim 1, wherein the thickness of the packaging material is between about 1 mil and about 5 mil.

12. The packaging material of claim 1, wherein the thickness of the packaging material is about 1.09 mil.

13. The packaging material of claim 1, wherein the volume ratio between the first layer:the second layer:the third layer is 15:70:15.

14. The packaging material of claim 1, wherein the carbon dioxide transmission rate of the sealed packaging material is between about 1000 to about 30,000 cubic centimeters per pound of produce.

15. The packaging material of claim 1, wherein the oxygen transmission rate of the sealed packaging material is between about 300 to about 5,000 cubic centimeters per pound of produce.

16. The packaging material of claim 1, wherein the water transmission rate of the sealed packaging material is between about 1 to about 15 cubic centimeters per pound of produce.

17. The packaging material of claim 1, wherein the 1-MCP transmission rate of the sealed packaging material is between about 1,000 to about 100,000 cubic centimeters per pound of produce.

18. The packaging material of claim 1, wherein the packaging material further comprises holes or perforations.

* * * * *